(12) United States Patent
Maeto et al.

(10) Patent No.: US 8,179,075 B2
(45) Date of Patent: May 15, 2012

(54) MOTOR DRIVING INTEGRATED CIRCUIT

(75) Inventors: Hidemi Maeto, Ota (JP); Shunji Suzuki, Gunma-ken (JP)

(73) Assignees: Semiconductor Components Industries, LLC, Phoenix, AZ (US); Sanyo Semiconductor Co., Ltd., Gunma (JP)

(*) Notice: Subject to any disclaimer, the term of this patent is extended or adjusted under 35 U.S.C. 154(b) by 809 days.

(21) Appl. No.: 12/055,183

(22) Filed: Mar. 25, 2008

(65) Prior Publication Data
US 2009/0021199 A1 Jan. 22, 2009

(30) Foreign Application Priority Data
Mar. 26, 2007 (JP) ................. 2007-080044

(51) Int. Cl.
*G05B 11/28* (2006.01)
(52) U.S. Cl. ......... 318/599; 318/811; 318/721; 318/799
(58) Field of Classification Search .......... 318/599, 318/603, 700, 400.01, 400.13, 400.14, 400.32, 318/779, 799, 801, 66, 811, 400.07, 400.1, 318/400.12, 280, 400.21, 721, 430, 466, 318/560; 388/800, 812
See application file for complete search history.

(56) References Cited

U.S. PATENT DOCUMENTS

| | | | | |
|---|---|---|---|---|
| 5,872,442 | A * | 2/1999 | Gotou | 318/727 |
| 6,075,328 | A * | 6/2000 | Notohara et al. | 318/400.09 |
| 6,358,263 | B2 * | 3/2002 | Mark et al. | 606/167 |
| 6,566,827 | B2 * | 5/2003 | Gotou et al. | 318/400.07 |
| 6,751,909 | B2 * | 6/2004 | Ranaudo | 49/506 |
| 6,922,029 | B2 * | 7/2005 | Fuse | 318/400.11 |
| 7,036,486 | B2 * | 5/2006 | Kamimura et al. | 123/399 |
| 7,105,944 | B2 * | 9/2006 | Wakitani et al. | 307/10.6 |
| 7,121,268 | B2 * | 10/2006 | Andoh et al. | 123/568.12 |
| 7,301,294 | B2 * | 11/2007 | Ogino et al. | 318/400.05 |
| 2004/0000882 | A1 * | 1/2004 | Wakitani et al. | 318/66 |

FOREIGN PATENT DOCUMENTS

JP 2001-320890 11/2001

* cited by examiner

*Primary Examiner* — Walter Benson
*Assistant Examiner* — Antony M Paul
(74) *Attorney, Agent, or Firm* — SoCal IP Law Group LLP; Steven C. Sereboff; John E. Gunther (57) ABSTRACT

A motor driving integrated circuit comprising: a speed control circuit configured to control a rotation speed of a motor according to a speed control signal; a detecting circuit configured to detect whether the speed control signal indicates stop of rotation of the motor; and a shut-off circuit configured to shut off power supply to a circuit included in the motor driving integrated circuit when the detecting circuit detects that the speed control signal indicates stop of rotation of the motor.

8 Claims, 6 Drawing Sheets

MOTOR DRIVING INTEGRATED CIRCUIT

CROSS-REFERENCE TO RELATED APPLICATION

This application claims the benefit of priority to Japanese Patent Application No. 2007-080044, filed Mar. 26, 2007, of which full contents are incorporated herein by reference.

BACKGROUND OF THE INVENTION

1. Field of the Invention

The present invention relates to a motor driving integrated circuit.

2. Description of the Related Art

Motor driving integrated circuits are included in various electronic apparatuses provided with a motor and, together with the motor, are considered to be important parts. Therefore, recently, in order to respond to various demands such as higher efficiency, lower power consumption, and enhanced usability, a plurality of functions are included in a motor driving integrated circuit of one-chip (see, e.g., Japanese Patent Application Laid-Open Publication No. 2001-320890).

For example, a PWM driving system is adopted for the higher efficiency. The PWM driving system is a system for controlling the number of rotation of the motor by adjusting on-duty (=on-time/(on-time+off-time)) of a driving transistor. The driving transistor has an advantage of reducing power consumption since the driving transistor is not always in the on-time but is in repeated cycles of the on-time and the off-time when energizing a drive coil. The on-duty is adjusted by slicing a triangular-wave signal with a level of a speed control voltage corresponding in level to the on-duty and being applied from an external microcomputer, etc., by way of a speed control input terminal so as to generate a PWM signal, and applying the PWM signal to a control electrode (base electrode or gate electrode) of the driving transistor.

A power off function is adopted for reducing the power consumption. The power off function is a function of shutting off power supply to circuits of the motor driving integrated circuit when rotation driving of the motor is stopped and the control in the motor driving integrated circuit is not performed for a predetermined period. Specifically, it is a function of turning off a power supply circuit and a bias circuit in the motor driving integrated circuit based on a power off signal input from the external microcomputer, etc., by way of a power off terminal.

Furthermore, a start/stop function is adopted for enhancing usability. The start/stop function is a function of controlling start or stop of the rotation driving of the motor at appropriate timing. Specifically, it is a function of starting the rotation driving of the motor at one level and stopping the rotation driving of the motor at the other level, out of binary level of a start/stop signal input from the external microcomputers, etc., by way of a start/stop input terminal.

To respond to a variety of demands, the motor driving integrated circuit is provided with a plurality of separate terminals, such as the speed control input terminal, the power off terminal, and the start/stop input terminal. However, in accordance with the incorporation of a plurality of the functions into the motor driving integrated circuit of one-chip as above, there arises a new problem of an increase in size of the circuit due to an increase in number of terminals.

SUMMARY OF THE INVENTION

A motor driving integrated circuit according to an aspect of the present invention, comprises: a speed control circuit configured to control a rotation speed of a motor according to a speed control signal; a detecting circuit configured to detect whether the speed control signal indicates stop of rotation of the motor; and a shut-off circuit configured to shut off power supply to a circuit included in the motor driving integrated circuit when the detecting circuit detects that the speed control signal indicates stop of rotation of the motor.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

<<<Signal Processing System of Sensorless Motor Driving Integrated Circuit>>>

Figure 1:
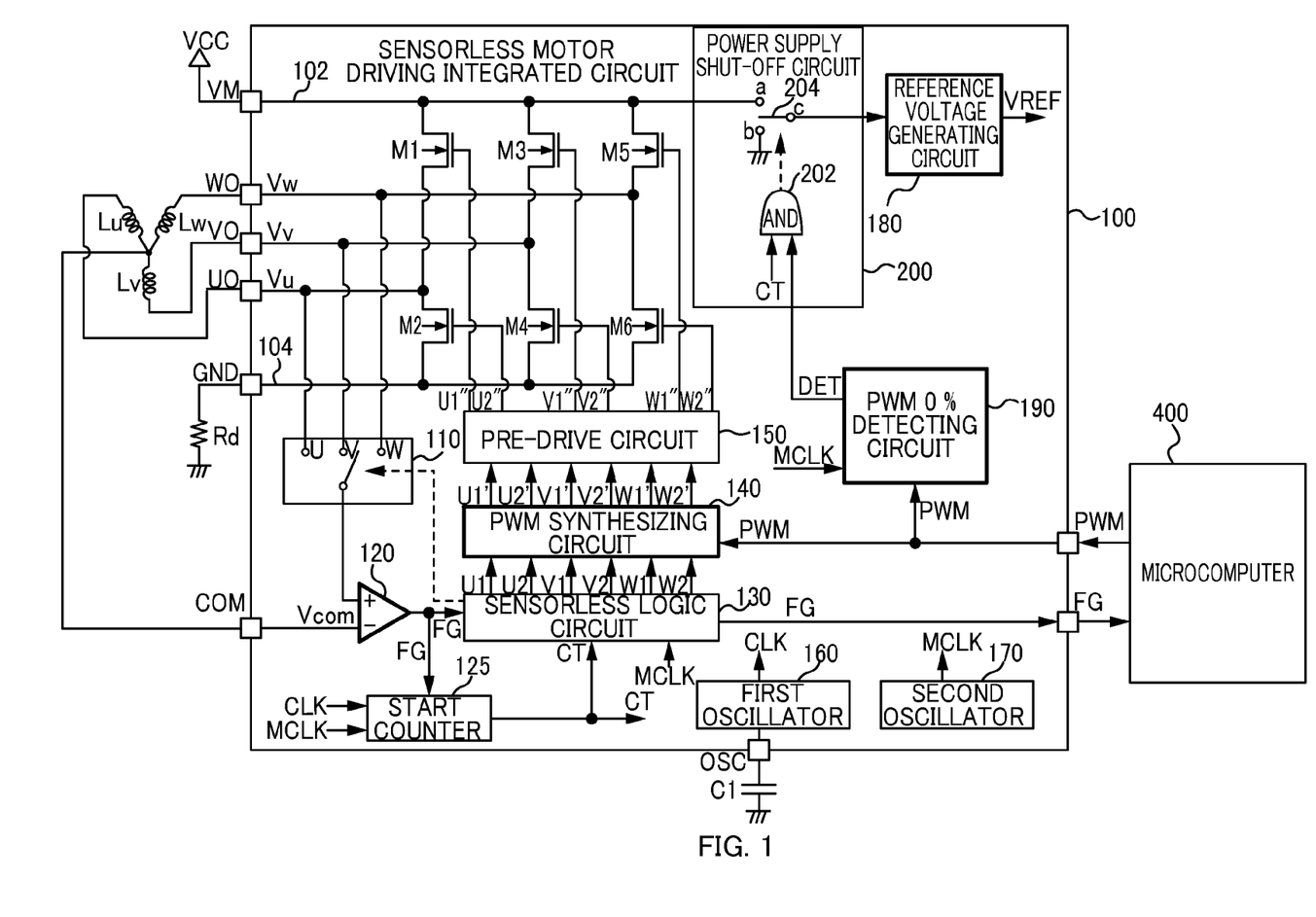
FIG. 1 is a diagram showing a configuration of a motor system using a sensorless motor driving integrated circuit according to one embodiment of the present invention.
Figure 2:
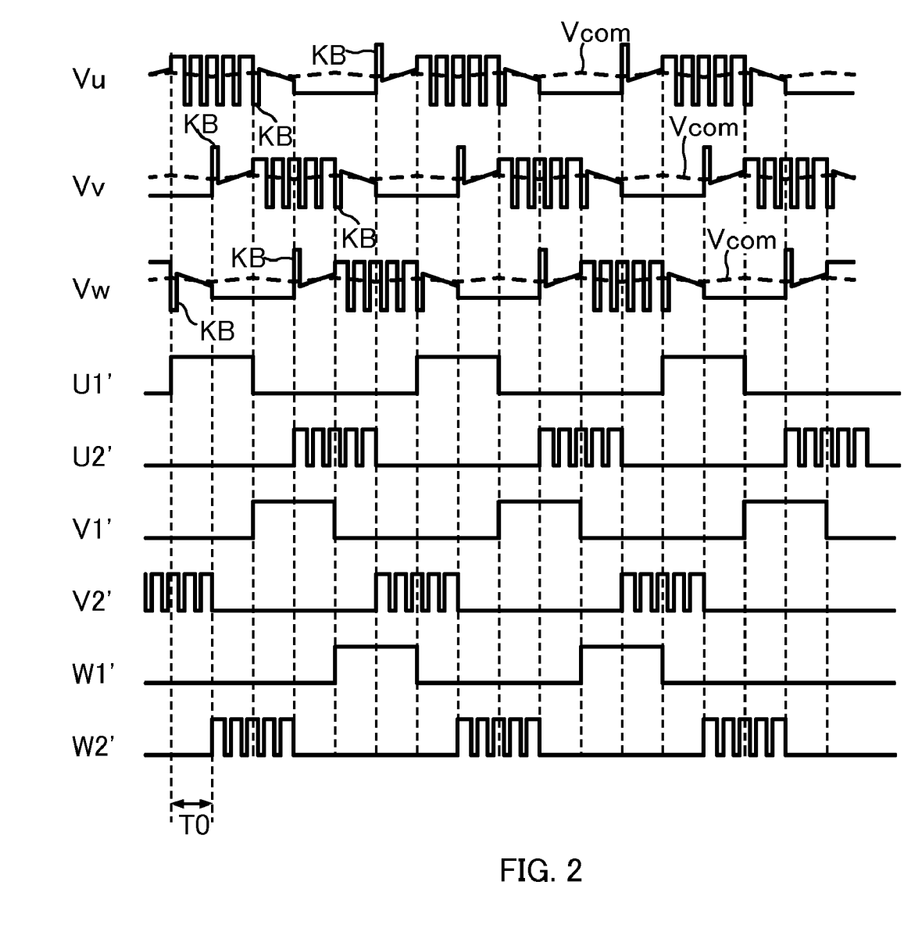
FIG. 2 is a waveform diagram of main signals of the sensorless motor driving integrated circuit according to one embodiment of the present invention.

Description will be made of a signal processing system of a sensorless motor driving integrated circuit 100 according to one embodiment of the present invention, using FIG. 1, with reference to FIGS. 2 to 4. As a motor system including the sensorless motor driving integrated circuit 100, there will be described, for example, a fan motor system that drives rotation of the motor (fan motor) for a fan (vane) emitting heat generated in electrical appliances (personal computer, air-conditioner, refrigerator, etc.) to the outside. As the sensorless motor driving circuit 100, a Bi-CMOS process integrated circuit is described, for example.

Three-phase (U-phase, V-phase, and W-phase) drive coils Lu, Lv, and Lw that are made by winding on a stator so as to be star-connected and displaced 120 electrical degrees in phase with respect to each other, are connected to a UO terminal, a VO terminal, and a WO terminal of the sensorless motor driving integrated circuit 100, respectively. As a result of this, the three-phase drive coils Lu, Lv, and Lw are connected, by way of the UO terminal, the VO terminal, and the WO terminal, to a driving transistor circuit configured with NMOS field effect transistors M1 to M6.

The NMOS field effect transistors M1, M3, and M5 disposed on the side of a source power line 102 are source-side (discharging side) transistors discharging a coil current IL flowing from the source power line 102 toward the U-phase, V-phase, and W-phase drive coils Lu, Lv, and Lw. The NMOS field effect transistors M2, M4, and M6 disposed on the side of a sink power line 104 are sink-side (absorbing side) transistors absorbing a coil current IL flowing from the U-phase, V-phase, and W-phase drive coils Lu, Lv, and Lw toward the sink power line 104. In a present embodiment, the NMOS transistors M1, M3, and M5 disposed on the side of the source power line 102 are saturation-driven and the NMOS transistors M2, M4, and M6 disposed on the side of the sink power line 104 are PWM-driven (non-saturation drive).

When the NMOS field effect transistors M1 to M6 are turned on and off at appropriate timing, the coil current IL corresponding to a level of a power supply voltage VCC is supplied to the three-phase drive coils Lu, Lv, and Lw. As a result of this, the sensorless motor rotates in a predetermined direction (for example, positive rotation) and, at one end of the three-phase drive coils Lu, Lv, and Lw, the coil voltages Vu, Vv, and Vw with the phase difference of the 120-degree electrical angle are generated. The coil voltages Vu, Vv, and Vw have a frequency corresponding to a rotation speed of the sensorless motor and are applied to input terminals U, V, and W included in a 3-input-1-output switch circuit 110 by way of the UO terminal, the VO terminal, and the WO terminal.

In accordance with any one phase of the U phase, the V phase, and the W phase as an object of detection of a zero-cross point, which will be described later, in a comparator 120 (binarizing circuit), one of the coil voltages Vu, Vv, and Vw to be applied to the input terminals U, V, and W of the switch circuit 110 is selected by a sensorless logic circuit 130 (energization control circuit). The selected voltage Vu, Vv, or Vw is applied to the + terminal of the comparator 120 by way of an output terminal of the switch circuit 110. On the other hand, a neutral point voltage Vcom of the star-connection of the three-phase drive coils Lu, Lv, and Lw is applied to the − terminal of the comparator 120 by way of a COM terminal of the senserless motor driving integrated circuit 100. That is, the coil voltage applied to the + terminal is any one of coil voltages Vu, Vv, and Vw to be selectively output from the switch circuit 110 as an object to be compared with the neutral point voltage Vcom. The neutral point voltage Vcom is a voltage at a connection point of the drive coils of two phases other than the phase as an object of detection of the zero-cross point.

As a result of this, the comparator 120 detects the zero-cross point, at which any one of the coil voltages Vu, Vv, and Vw selected at the switch circuit 110 and applied to the + terminal and the neutral point voltage Vcom applied to the − terminal cross each other. Then, the comparator 120 outputs a rectangular-wave-shaped FG signal whose edge is switched between rising edge and falling edge at such zero-cross point to the sensorless logic circuit 130 and at the same time, outputs the FG signal to a microcomputer 400 by way of an FG output terminal. As a result of this, the microcomputer 400 detects a present rotation speed of the sensorless motor based on the FG signal so as to be able to adjust the on-duty of a PWM signal to be input to a PWM input terminal.

The sensorless logic circuit 130, in consideration of the fact that the sensorless motor itself cannot determine the relative position of a rotor and a stator before the start, turns on and off the NMOS field effect transistors M1 to M6 according to a predetermined order of energization, to perform a predetermined energization control for flowing the coil current to the U-phase, V-phase, and W-phase drive coils Lu, Lv, and Lw. Specifically, the sensorless logic circuit 130, after removing (masking) noise corresponding to a kick back pulse KB from the FG signal output from the comparator 120, generates and outputs drive signals U1, U2, V1, V2, W1, and W2, based on such an FG signal with the noise removed. The drive signals U1, V1, and W1 are control signals for driving gate electrodes of the NMOS field effect transistors M1, M3, and M5, respectively, on the side of the source power line 102. The drive signals U2, V2, and W2 are the control signals for driving the gate electrodes of the NMOS field effect transistors M2, M4, and M6, respectively, on the side of the sink power line 104.

The drive signals U1, U2, V1, V2, W1, and W2 output from the sensorless logic circuit 130 are input to a PWM synthesizing circuit 140 (speed control circuit) and are combined with (superimposed on) the PWM signal input from the microcomputer 400 by way of the PWM input terminal. The PWM signal is a speed control signal with on-duty in proportion to the rotation speed of the sensorless motor. The on-duty of the PWM signal means a ratio of a pulse width within one period of the PWM signal and corresponds to the on-duty of the NMOS transistors M1 to M6 (ratio between the on-time and the switching period (=on-time +off-time) of a driving transistor). For example, the on-duty of the PWM signal is set at 100% in the case of the full speed rotation, at 0% in the case of the stop, and at 50% in the case of the speed one half of the full speed rotation.

The drive signals U1, U2, V1, V2, W1, and W2 output from the PWM synthesizing circuit 140 are input to a predrive circuit 150. There are output, from the predrive circuit 150, signals U1", U2", V1", V2", W1", and W2" amplified so as to drive NMOS field-effect transistors M1 to M6.

In a present embodiment according to the present invention, since the driving transistors M2, M4, and M6 on the side of the sink power line 104 are PWM-driven, the PWM synthesizing circuit 140 combines the PWM signal with the drive signals U2, V2, and W2 out of the drive signals U1, U2, V1, V2, W1, and W2. As a result, waveforms of the drive signals U1', U2', V1', V2', W1', and W2' output from the PWM synthesizing circuit 140 are those as shown in FIG. 2. That is, the drive signals U1', V1', and W1' are the same in waveform as the drive signals U1, V1, and W1 output from the sensorless logic circuit 130, and waveforms of the drive signals U2', V2', and W2' are those repeating the on-time (H level period) and the off-time (L level period).

The FG signal output from the comparator 120 is input to a start counter 125 as well as to the sensorless logic circuit 130. The start counter 125 is a counter that repeatedly performs counting operation for a predetermined count period in order to set a timing at which the sensorless logic circuit 130 switches energization to the drive coils Lu, Lv, and Lw according to the start logic, when starting the sensorless motor.

Figure 3:
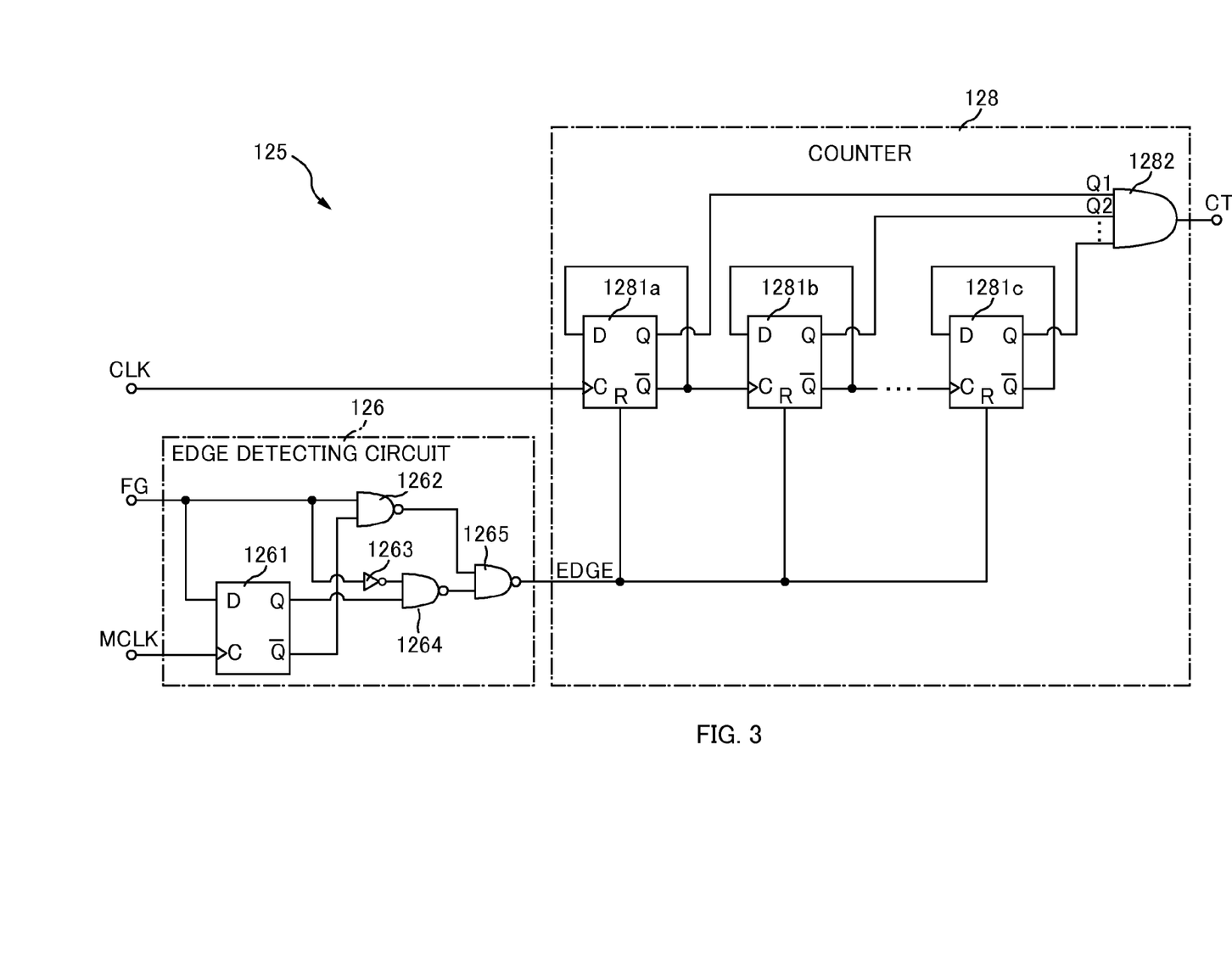
FIG. 3 is a configuration diagram of a start counter according to one embodiment of the present invention.
Figure 4:
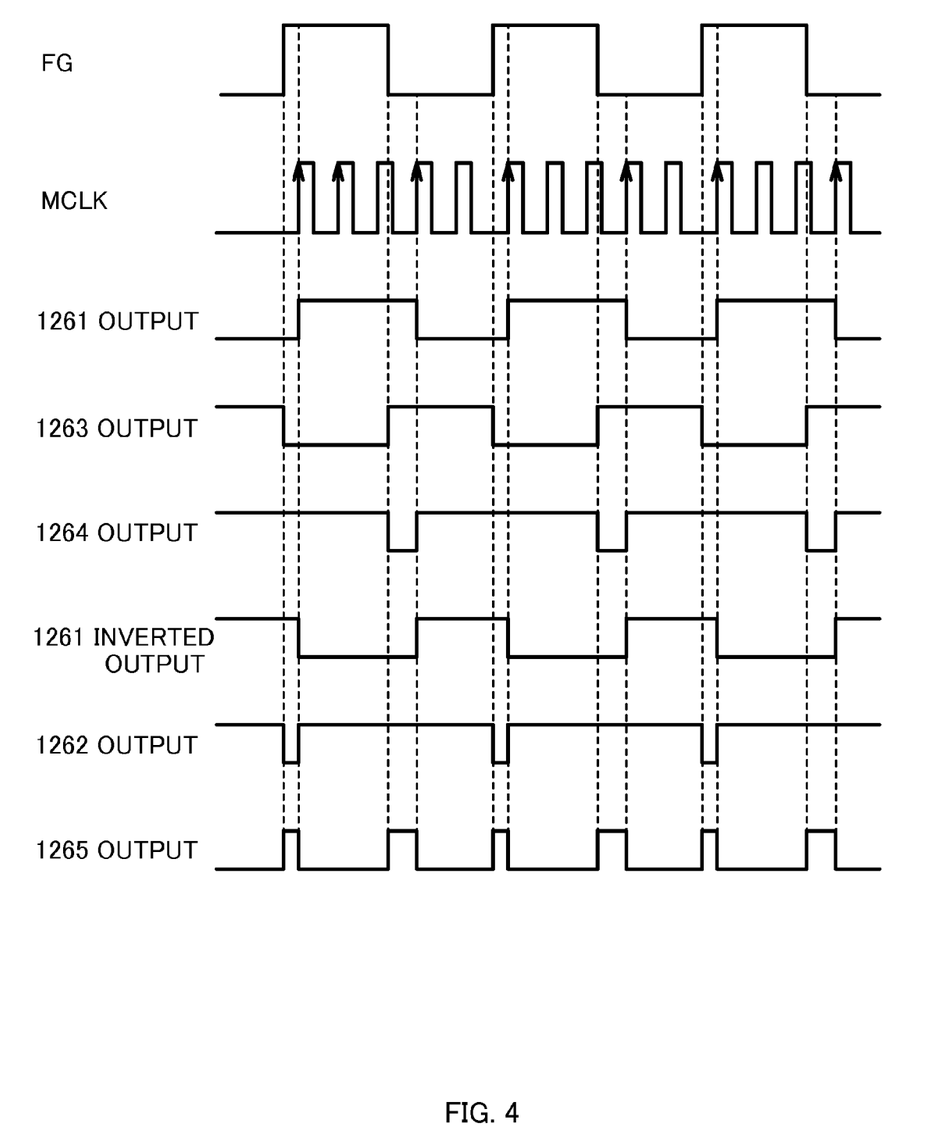
FIG. 4 is a waveform diagram of main signals of an edge detecting circuit included in the start counter according to one embodiment of the present invention.

Specifically, the start counter 125 is configured with an edge detecting circuit 126 and a counter 128 as shown in FIG. 3 and operates according to the waveforms shown in FIG. 4, for example.

To be more specific, the FG signal output from the comparator 120, after removal (masking) of the noise corresponding to the kick back pulse KB, is input to a data input of a D flip-flop 1261 and one of two inputs of a NAND element 1262. A second clock MCLK generated in a second oscillator 170 is input to a clock input of the D flip-flop 1261. The second clock MCLK has a frequency exceedingly higher than that of the FG signal. Therefore, the edge detecting circuit 126, utilizing a difference of delay between a timing of the edge switching of the FG signal and a timing of data taking-in by the second clock MCLK of the D flip-flop 1261, outputs an edge detecting signal EDGE indicating detection of an edge of the FG signal from the NAND element 1265. The edge detecting signal EDGE has a waveform of one pulse with H level for a predetermined period when detecting the edge of the FG signal shown in FIG. 4.

On the other hand, in the counter 128, the edge detecting signal EDGE generated in the edge detecting circuit 126 is input to each reset input of a plurality of D flip-flops (1281a to 1281c). A first clock CLK generated in a first oscillator 160 is input to a clock input of a D flip-flop 1281a in a first-stage. When the plurality of D flip-flops (1281a to 1281c) are not reset by the edge detecting signal EDGE, the counter 128 frequency-divides the first clock CLK in accordance with the number of stages of the plurality of D flip-flops (1281a to 1281c). For example, the frequency is divided by two in the D flip-flop 1281a in the first stage and is divided by four in the D flip-flop 1281b in a second stage.

When respective outputs (Q1, Q2, . . . ) of the plurality of D flip-flops (1281a to 1281c) are all at the H level, an AND element 1282 outputs an H-level count signal CT. At this time, if the plurality of D flip-flops (1281a to 1281c) are N pieces of D flip-flops, then it indicates that the counter 128 counts for the count period from "0" to "2 raised to Nth power−1". After counting for the count period, the counter 128 repeats the counting for the count period from "0" to "2 raised to Nth power−1", again.

There is a case where, despite the energizing of any of the drive coils Lu, Lv, and Lw according to the start logic, the sensorless motor does not rotate and remains stopped due to a positional relationship between the rotor and the stator. In such a case, since the zero-cross point is not detected at which any one of the coil voltages Vu, Vv, and Vw and the neutral point voltage Vcom cross each other, there is not detected the edge of the FG signal output from the comparator 120.

At this time, the plurality of D flip-flops (1281a to 1281c) are not reset and the start counter 125 outputs the H-level count signal CT. Upon receipt of the H-level count signal CT from the start counter 125, the sensorless logic circuit 130 judges that the sensorless motor remains stopped. As a result of this, the sensorless logic circuit 130 newly energizes any of the drive coils Lu, Lv, and Lw to be energized next according to the start logic.

Consequently, when the sensorless motor starts to rotates, the zero-cross point is detected at which any one of the coil voltages Vu, Vv, and Vw and the neutral point voltage Vcom cross each other and therefore, the edge of the FG signal output from the comparator 120 is detected. At this time, in the start counter 125, the plurality of D flip-flops (1281a to 1281c) are reset and the H-level count signal CT is not output. That is, since the count signal CT is kept at L level, when being kept at the L level for a predetermined period, the sensorless logic circuit 130 can detect the rotation of the sensorless motor, thereby stopping the energization of the drive coil Lu, Lv, or Lw according to the start logic.

The first oscillator 160 generates the first clock CLK by charging and discharging a capacitor element Cl connected to an OSC terminal. The first clock CLK is used as a counter clock in the start counter 125. When starting the sensorless motor, the timing of switching the energization of the drive coils Lu, Lv, and Lw of phases (for example, period corresponding to electrical angle of 60 degrees) is set by the counting operation of the start counter 125 based on the first clock CLK. When the timing of switching the energization differs depending on specification of the sensorless motor, there is adjusted a capacitance value of the capacitor element C1 connected to the OSC terminal.

The second oscillator 170 generates the second clock MCLK with a frequency higher than that of the first clock CLK. The second clock MCLK is used as a system clock of the sensorless motor driving integrated circuit as a whole. For example, the second clock MCLK is supplied to the start counter 125, the sensorless logic circuit 130, a PWM 0% detecting circuit 190, etc., and operating timing thereof is based on the second clock MCLK.

<<<Power Supply System of Sensorless Motor Driving Integrated Circuit>>>

Figure 5:
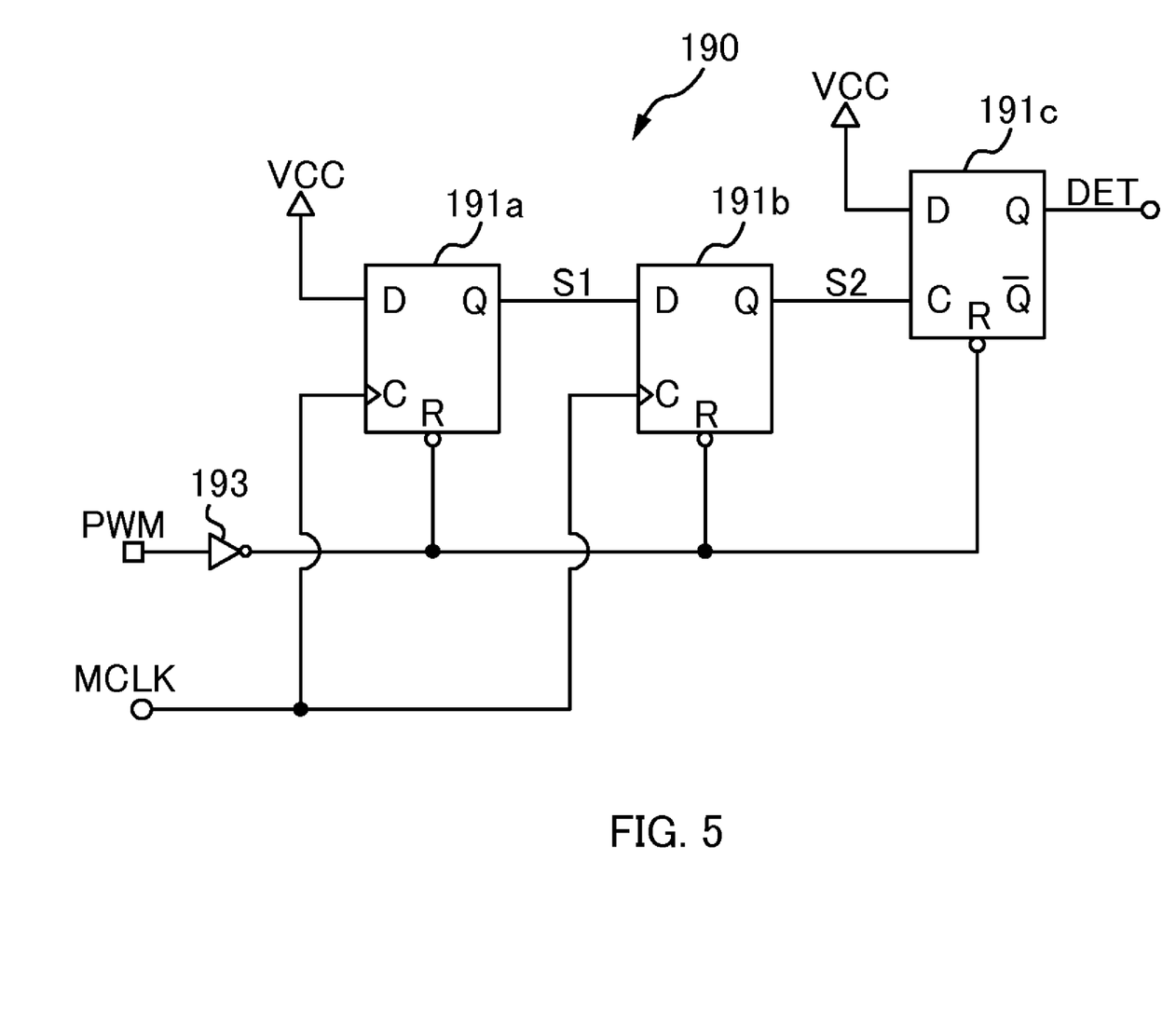
FIG. 5 is a configuration diagram of a PWM 0% detecting circuit according to one embodiment of the present invention.

There will be described a power supply system of the sensorless motor driving integrated circuit 100 according to one embodiment of the present invention, using FIG. 1, with reference to FIGS. 5 and 6.

A VM terminal of the sensorless motor driving integrated circuit 100 is applied with the power supply voltage VCC of a level corresponding to the rotation speed so as to perform PAM (Pulse Amplitude Modulation) control and a GND terminal thereof is grounded by way of a resistor element Rd. The power supply voltage VCC applied to the VM terminal is converted into a reference voltage VREF by a reference voltage generating circuit 180. The reference voltage VREF is used as a bias voltage for operating various circuits inside the sensorless motor driving integrated circuit 100. Therefore, the reference voltage generating circuit 180 can not generate the reference voltage VREF when the application of the power supply voltage VCC is shut off. At this time, the sensorless motor driving integrated circuit 100 is in such a state that the power supply to various circuits is shut off.

The PWM input terminal of the sensorless motor driving integrated circuit 100 is used for the purpose of the power supply shut-off other than the speed control as described earlier. The PWM 0% detecting circuit 190 (detecting circuit) is provided for the power supply shut-off use of this PWM input terminal. The PWM 0% detecting circuit 190: monitors the PWM signal supplied from the microcomputer 400 to the PWM synthesizing circuit 140 by way of the PWM input terminal; and outputs a PWM 0% detecting signal DET (detecting signal) showing a detection result as to whether the on-duty of the PWM signal is 0% indicating that rotation driving of the sensorless motor is caused to stop. In a present embodiment according to the present invention, the detection of whether the on-duty of the PMW signal is 0% is performed by detecting whether the PWM signal is fixed at the L level for a predetermined period.

Specifically, in the PWM 0% detecting circuit 190, the PWM signal input from the microcomputer 400 by way of the PWM input terminal is input to the reset inputs of D flip-flops 191a to 191c by way of an inverter element 193. The second clock MCLK generated in the second oscillator 170 is input to the clock inputs of the D flip-flops 191a and 191b.

Here, when the D flip-flops 191a and 191b are not reset, the H level corresponding to the power supply voltage VCC applied to the data input of the D flip-flop 191a is latched to the D flip-flop 191a based on the second clock MCLK, and thereafter, is latched to the D flip-flop 191b. Then, since an output signal S2 of the D flip-flop 191b rises up, the H level corresponding to the power supply voltage VCC applied to the data input of the D flip-flop 191c is latched to the D flip-flop 191c. As a result of this, the PWM 0% detecting signal DET output from the D flip-flop 191 in a final stage becomes at the H level.

Figure 6:
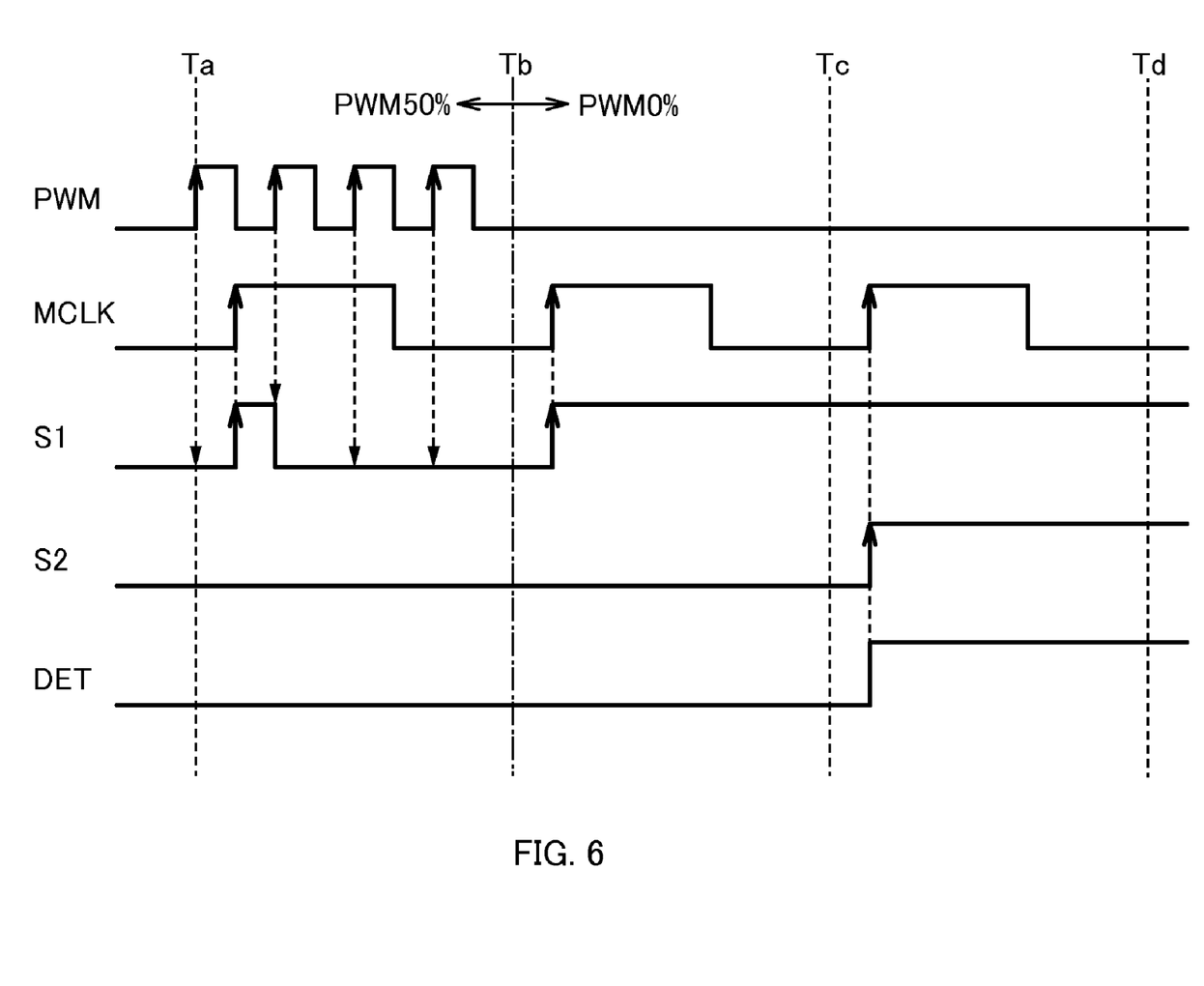
FIG. 6 is a waveform diagram of main signals of the PWM 0% detecting circuit according to one embodiment of the present invention.

However, as in a period (Ta to Tb) shown in FIG. 6, when the on-duty of the PWM signal is set at more than 0%, the PWM signal is at the H level and the L level alternatively and when the PWM signal is at the H level, the H level latched to the D flip-flops 191a and 191b is reset. Therefore, the PWM 0% detecting signal DET does not become at the H level.

On the other hand, as in a period (Tb to Td) shown in FIG. 6, when the on-duty of the PWM signal is set at 0%, the PWM signal remains at the L level, and therefore, the H level latched to the D flip-flops 191a and 191b is not reset. As a result of this, there becomes at the H level firstly the output S1 of the D flip-flop 191a and next the output S2 of the D flip-flop 191b. Then, when the output S2 of the D flip-flop 191b becomes at the H level, the PWM 0% detecting signal DET output from the D flip-flop 191c in the final-stage becomes at the H level. That is, since the PWM 0% detecting circuit 190 outputs PWM 0% detecting signal DET of the H-level, it is detected that the on-duty of the PWM signal is 0%.

The sensorless motor driving integrated circuit 100 is provided with a power supply off circuit 200 including an AND element 202 and a switch circuit 204, in connection with the PWM 0% detecting circuit 190, for the power supply shut-off use of the PWM input terminal.

The AND element 202 is input with the PWM 0% detecting signal DET output from the PWM 0% detecting circuit 190 and the count signal CT output from the start counter 125, separately. Either an a-terminal to which the power supply voltage VCC is applied or a b-terminal that is grounded, is selected by the switch circuit 204 based on the output of the AND element 202.

Specifically, when both of the PWM 0% detecting signal DET and the count signal CT are at the H level, the switch circuit 204 selects the b-terminal based on the H-level output signal of the AND element 202. As a result of this, the reference voltage generating circuit 180 is not applied with the power supply voltage VCC, so that the reference voltage VREF can not be generated. Therefore, the sensorless motor driving integrated circuit 100 is in such a state that the power supply to various circuits is shut off.

On the other hand, when at least one of the PWM 0% detecting signal DET and the count signal CT is at the L level, the switch circuit 204 selects the a-terminal based on the L-level signal of the AND element 202. As a result of this, the reference voltage generating circuit 180 is applied with the power supply voltage VCC, so that the reference voltage VREF can be generated. Therefore, the sensorless motor driving integrated circuit 100 is in such a state that the power is supplied to various circuits.

There will be hereinafter be described specific operation examples of the PWM 0% detecting circuit 190.

Firstly, there will be described a case where the on-duty of the PWM signal is not 0%, with the sensorless motor being in rotation driving state. In this case, since any of the coil voltages Vu, Vv, and Vw is detected, the edge of the FG signal is detected in the start counter 125. As a result of this, since resetting is repeated by the edge of the FG signal, the start counter 125 outputs the L-level count signal CT. As a result of this, the AND element 202 outputs the L level and the switch circuit 204 selects the a-terminal.

Secondly, in a case where the PWM signal (L level) with the on-duty set at 0% is input from the microcomputer 400 to the PWM input terminal, the PWM 0% detecting circuit 190, detects that the PWM signal input to the PWM input terminal is fixed at the L level for the predetermined period, generates the PWM 0% detecting signal DET of the H-level. At this time, the PWM synthesizing circuit 140 generates the drive signals U1', U2', V1', V2', W1', and W2' obtained by combining: the PWM signal with the on-duty set at 0%; with the drive signals U1, U2, V1, V2, W1, and W2 generated by the sensorless logic circuit, but it takes time until the sensorless motor comes to a stop. Therefore, the start counter 125 outputs the count signal CT of the L-level in a period during which the coil voltage Vu, VV, or Vw continues to be detected, while the sensorless motor is in the process of gradually reducing its speed toward its stop. At this time, the output of the AND element 202 is at the L level and the switch circuit 204 selects the a-terminal.

Thereafter, when the sensorless motor comes to a stop, no coil voltage Vu, Vv, or Vw is detected. As a result of this, the start counter 125 is not reset by the edge detecting signal EDGE of the FG signal and the count signal CT of the H-level can be output. Then, when the start counter 125 outputs the count signal CT of the H-level, the output of the AND element 202 becomes at the H level. As a result of this, the switch circuit 204 selects the b-terminal, and therefore, the reference voltage generating circuit 180 is not applied with the power supply voltage VCC, so that the reference voltage VREF can not be generated. That is, the sensorless motor driving integrated circuit 100 is in such a state that the power supply to various circuits is shut off.

As seen above, when the PWM signal input to the PWM input terminal is set at 0% for the on-duty thereof, the sensorless motor driving integrated circuit 100 can stop the rotation of the sensorless motor, so that various kinds of circuits are in the power supply shut-off state. That is, it is possible to allow one PWM input terminal to have a use of shutting off the power supply to various circuits in the sensorless motor driving integrated circuit 100, in addition to an ordinary use of inputting the PWM signal with the set on-duty. In other words, it becomes possible to provide the motor driving integrated circuit with a plurality of functions while restraining an increase in number of terminals.

<<Other Embodiments>>

It may be so arranged that the above PWM input terminal will be designed to have a further use of starting or stopping the rotation driving of the sensorless motor. That is, when the on-duty of the PWM signal is changed from a state of being set at a value more than 0% to a sate of being set at 0%, the NMOS transistor M2, M4, and M6 are turned off by the drive signals U2', V2', and W2' generated in the PWM synthesizing circuit 140 and therefore, the rotation driving of the sensorless motor stops. When the on-duty of the PWM signal is changed from the state of being set at 0% to the sate of being set at more than 0%, the rotation driving of the sensorless motor starts.

The PWM input terminal may also be a speed control voltage input terminal for applying the speed control voltage corresponding to the on-duty of the PWM signal. In this case, sensorless motor driving integrated circuit 100, based on the level of the speed control voltage input by way of a speed control voltage input terminal, sets the on-duty of the PWM signal to be used in turning on and off the driving transistors M2, M4, and M6 described above. Specifically, by slicing a predetermined triangular wave signal with a level of the speed control voltage, there is generated the PWM signal whose on-duty is set according to the level of speed control voltage. At this time, when the speed control voltage is set at a level higher than a peak level of the predetermined triangular wave signal, the PWM signal generated as a result of the slicing with a level of the speed control voltage is fixed at the L level, that is, the on-duty is set at 0%. Therefore, the PWM 0% detecting circuit 190 detects whether the on-duty of the PWM signal is 0%, which is generated as a result of the slicing of the triangular wave signal with a level of the speed control voltage.

A PMOS transistor and a bipolar transistor as well as the NMOS transistor may be employed as the discharging side transistor and the absorbing side transistor that drive the drive coils Lu, Lv, and Lw. Specifically, it is conceivable that the PMOS transistor is employed as the discharging side transistor and the NMOS transistor as the absorbing side transistor.

However, since the NMOS transistor is suitable for integration as compared with the PMOS transistor and the bipolar transistor, it is preferable to use the NMOS transistor for both of the discharging side transistor and the absorbing side transistor.

According to an embodiment of the present invention, the absorbing side transistors M2, M4, and M6 are PWM-driven but this is not limitative. For example, both of the discharging side transistors M1, M3, and M5 and the absorbing side transistors M2, M4, and M6 may be PWM-driven complementarily, or only the discharging side transistors M1, M3, and M5 may be PWM-driven and the absorbing side transistors M2, M4, and M6 may be saturation-driven.

The sensorless motor is not limited to a three-phase motor but may be a single-phase motor. In this case, an H-bridge circuit including two pairs of discharging side transistors and absorbing side transistors is connected to a drive coil of the single-phase motor. The present invention can be applied to a motor with a sensor equipped with a Hall element. In the case of applying the present invention to the motor with the sensor, in order to generate a signal corresponding to a count signal CT, it is necessary to provide a counter that resets based on a binary signal obtained by binarizing a rotor position detecting signal in a shape of sine-wave detected at the Hall element, in place of the start counter 125.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor driving integrated circuit comprising:
   a speed control circuit configured to control a rotation speed of a motor according to a speed control signal;
   a detecting circuit configured to detect whether the speed control signal indicates stop of rotation of the motor;
   a shut-off circuit configured to shut off power supply to a circuit included in the motor driving integrated circuit when the detecting circuit detects that the speed control signal indicates stop of rotation of the motor;
   a binarizing circuit configured to output a binary signal obtained by binarizing a signal having a frequency corresponding to rotation speed of the motor, the signal being obtained from the motor;
   an edge detecting circuit configured to detect an edge of the binary signal; and
   a counter configured to be reset according to the edge of the binary signal detected by the edge detecting circuit, wherein
   the shut-off circuit shuts off the power supply when the detecting circuit detects that the speed control signal indicates stop of rotation of the motor and the counter counts for a predetermined period longer than an interval between edges of the binary signal.

2. The motor driving integrated circuit of claim 1, wherein the motor includes a sensorless motor including drive coils of multiple phases, and wherein
   the motor driving integrated circuit includes an energization control circuit configured to switch energization for the drive coils when the counter counts for the predetermined period, in a case of starting the sensorless motor.

3. The motor driving integrated circuit of claim 1, wherein the speed control signal is a pulse width modulated signal having a pulse width corresponding to rotation speed of the motor, and
   the detecting circuit is configured to
   determine whether the pulse width is detected within a predetermined period, and
   detect that the speed control signal indicates stop of rotation of the motor, when determining that the pulse width is not detected within the predetermined period.

4. The motor driving integrated circuit of claim 1, wherein the speed control signal is a speed control voltage having a level corresponding to rotation speed of the motor,
   the speed control circuit is configured to generate a pulse width modulated signal by slicing a predetermined triangular wave signal with a level of the speed control voltage, and
   the detecting circuit is configured to
   determine whether the pulse width is detected within a predetermined period, and
   detect that the speed control input signal indicates stop of rotation of the motor, when determining that the pulse width is not detected within the predetermined period.

5. A motor driving integrated circuit comprising:
   a speed control circuit configured to receive a speed control signal indicating a target rotation speed of a motor and to control a rotation speed of the motor according to the speed control signal;
   a detecting circuit configured to detect whether the speed control signal indicates stop of rotation of the motor; and
   a shut-off circuit configured to shut off power supply to a circuit included in the motor driving integrated circuit when the detecting circuit detects that the speed control signal indicates stop of rotation of the motor, wherein
   the speed control signal is a pulse width modulated signal having a pulse width corresponding to rotation speed of the motor, and
   the detecting circuit is configured to
   determine whether the pulse width is detected within a predetermined period, and
   detect that the speed control signal indicates stop of rotation of the motor, when determining that the pulse width is not detected within the predetermined period.

6. The motor driving integrated circuit of claim 5, wherein the motor includes a sensorless motor including drive coils of multiple phases, and wherein
   the motor driving integrated circuit includes an energization control circuit configured to switch energization for the drive coils when the counter counts for the predetermined period, in a case of starting the sensorless motor.

7. A motor driving integrated circuit comprising:
   a speed control circuit configured to receive a speed control signal indicating a target rotation speed of a motor and to control a rotation speed of the motor according to the speed control signal;
   a detecting circuit configured to detect whether the speed control signal indicates stop of rotation of the motor; and
   a shut-off circuit configured to shut off power supply to a circuit included in the motor driving integrated circuit when the detecting circuit detects that the speed control signal indicates stop of rotation of the motor, wherein
   the speed control signal is a speed control voltage having a level corresponding to rotation speed of the motor,
   the speed control circuit is configured to generate a pulse width modulated signal by slicing a predetermined triangular wave signal with a level of the speed control voltage, and
   the detecting circuit is configured to
   determine whether the pulse width is detected within a predetermined period, and detect that the speed control input signal indicates stop of rotation of the motor, when determining that the pulse width is not detected within the predetermined period.

8. The motor driving integrated circuit of claim 7, wherein the motor includes a sensorless motor including drive coils of multiple phases, and wherein the motor driving integrated circuit includes an energization control circuit configured to switch energization for the drive coils when the counter counts for the predetermined period, in a case of starting the sensorless motor.

* * * * *